United States Patent [19]
Gregor et al.

[11] Patent Number: 5,979,343
[45] Date of Patent: Nov. 9, 1999

[54] PLENUM DAMPER AND BAFFLE PLATE ARRANGEMENT FOR PNEUMATIC DISTRIBUTION SYSTEM

[75] Inventors: David Walter Gregor, Davenport, Iowa; Nathan Albert Mariman, Geneseo, Ill.; Michael Zhivov; Ronald Alan Hall, both of Indianapolis, Ind.

[73] Assignee: Deere & Company, Moline, Ill.

[21] Appl. No.: 09/116,372

[22] Filed: Jul. 16, 1998

[51] Int. Cl.⁶ ..................................................... A01C 7/00
[52] U.S. Cl. ........................... 111/175; 111/178; 111/186; 406/181; 221/278
[58] Field of Search ..................................... 111/178, 174, 111/175, 179, 186, 925, 77; 221/278; 222/367, 372, 373, 273; 406/113, 156, 157, 160, 181

[56] References Cited

U.S. PATENT DOCUMENTS

| | | | |
|---|---|---|---|
| 4,296,695 | 10/1981 | Quanbeck | 111/34 |
| 4,453,866 | 6/1984 | Ryan | 406/70 |
| 4,709,860 | 12/1987 | Patrick et al. | 239/654 |
| 4,793,743 | 12/1988 | Grodecki et al. | 406/123 |
| 4,834,004 | 5/1989 | Butuk et al. | 111/200 |
| 5,592,889 | 1/1997 | Bourgault | 111/174 |
| 5,826,523 | 10/1998 | Gregor | 111/181 |
| 5,845,818 | 12/1998 | Gregor et al. | 222/273 |
| 5,855,303 | 1/1999 | Gregor | 222/368 |
| 5,878,679 | 3/1999 | Gregor et al. | 111/178 X |

FOREIGN PATENT DOCUMENTS

| | | | |
|---|---|---|---|
| 1313795 | 2/1993 | Canada | 111/33.1 |

OTHER PUBLICATIONS

Deere & Co., John Deere Parts Catalog PC2348 for 787 Air Seeding System, 2 pages— 8–9 dated Oct. 24, 1994, published in the U.S.A.

*Primary Examiner*—Victor Batson

[57] ABSTRACT

An air seeder is provided with a pneumatic distribution system for delivering product through a plurality of primary tubes arranged in first and second rows. The pneumatic distribution system has a plenum housing having a plurality of outlet ports also arranged in first and second rows, each of said plurality of outlet ports associated with one of the primary tubes. A fan is in fluid communication with the upstream end of the plenum housing. A damper is mounted in the plenum housing upstream from the outlet ports for directing the air flow toward at least one of the first and second rows of primary tubes, and a perforated baffle plate is mounted in the housing between the damper and the outlet ports. The baffle plate has a plurality of openings adapted for governing the airflow into the outlet ports.

27 Claims, 4 Drawing Sheets

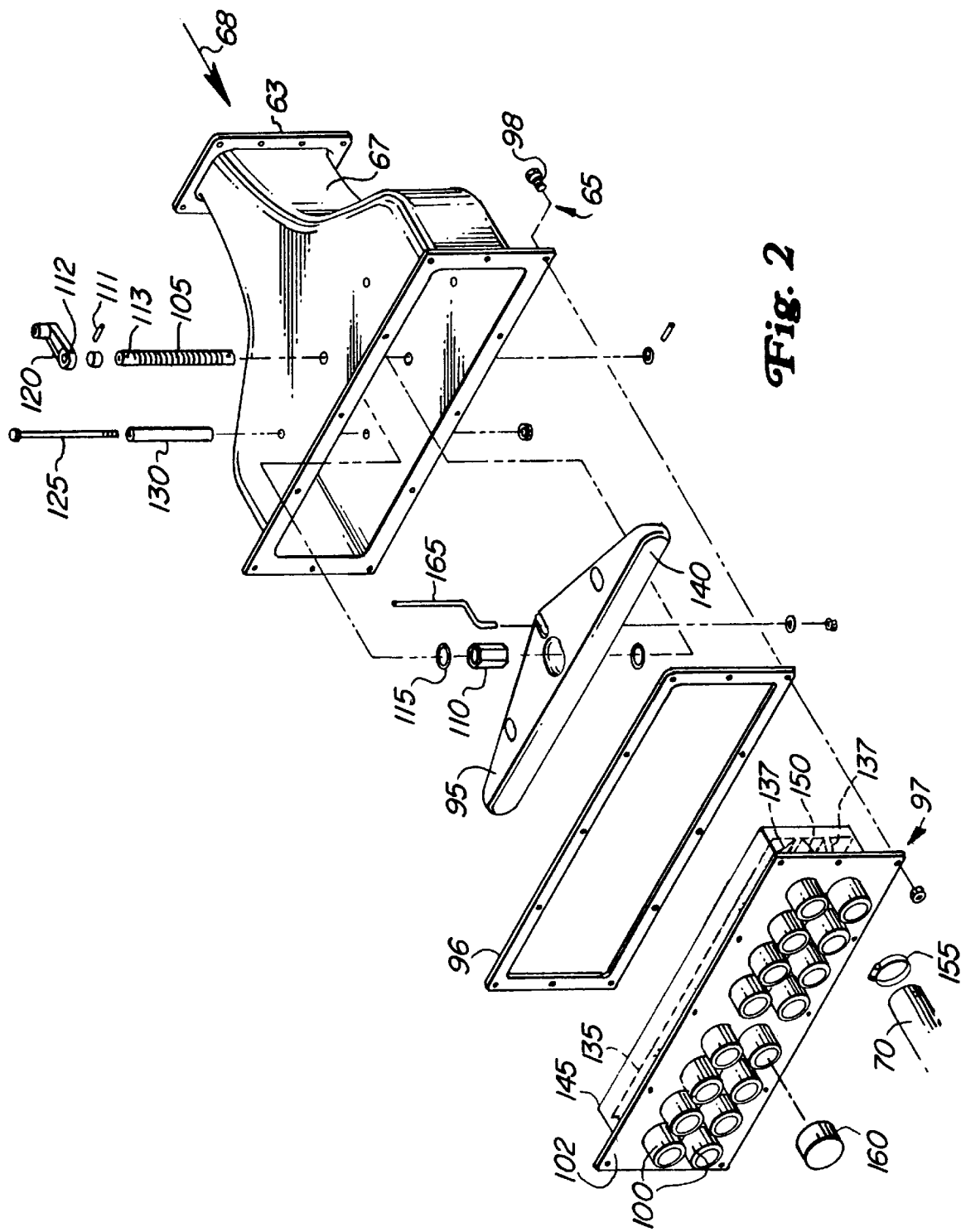

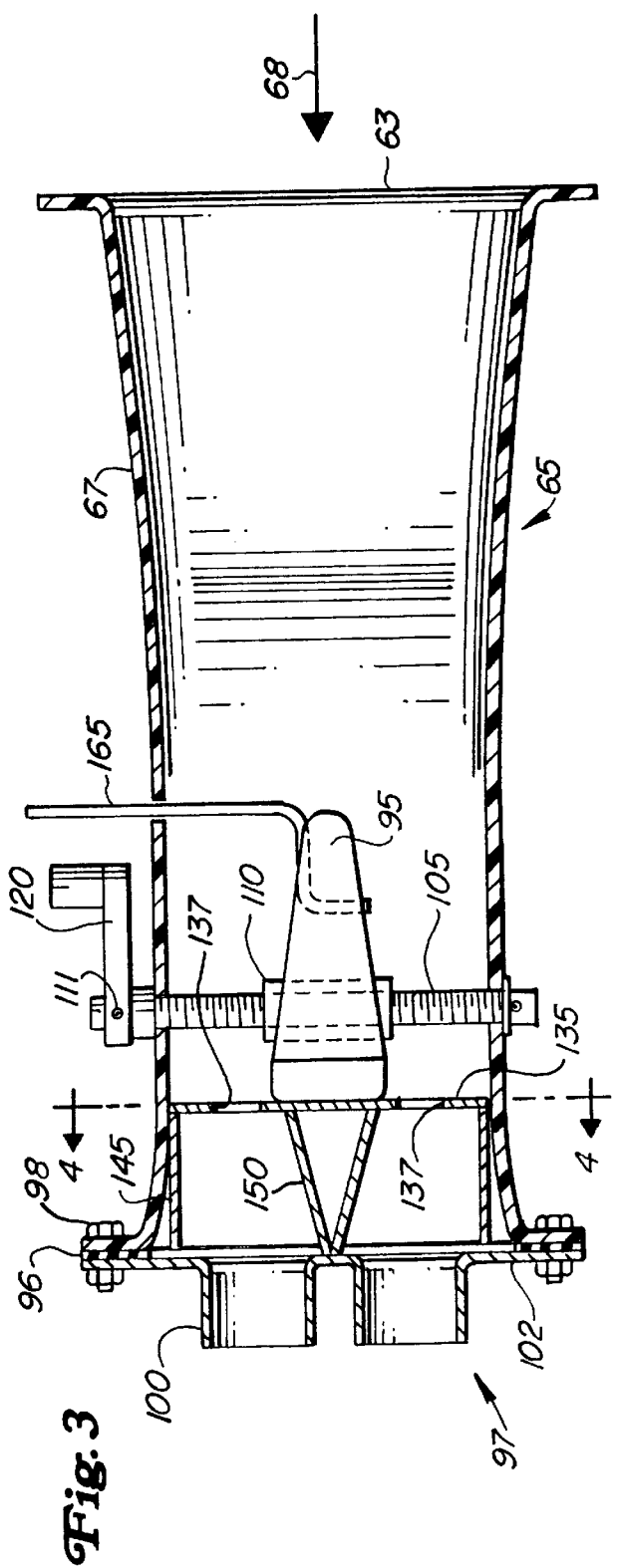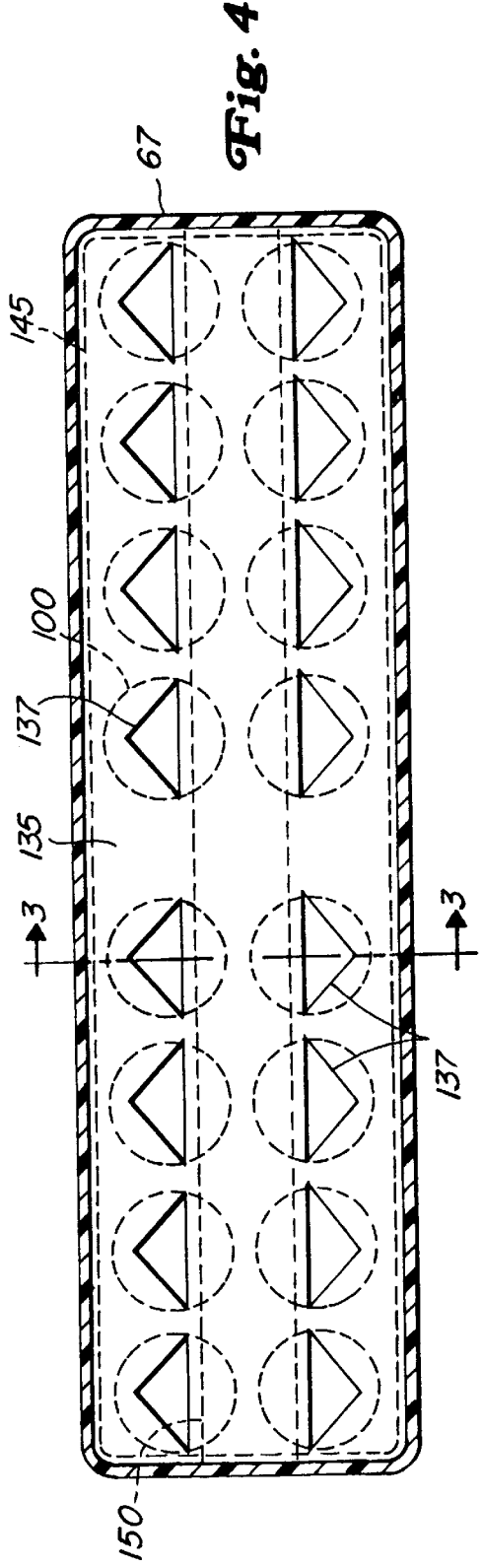

PLENUM DAMPER AND BAFFLE PLATE ARRANGEMENT FOR PNEUMATIC DISTRIBUTION SYSTEM

1) FIELD OF THE INVENTION

The present invention relates to pneumatic distribution systems and particularly to a pneumatic distribution system for agricultural air seeders having a double-shoot configuration.

2) BACKGROUND OF THE INVENTION

Air seeders are commonly towed by tractors to apply seed or fertilizer, or both simultaneously, to a field. An air seeder has as its central component a wheeled seed cart, which comprises one or more frame-mounted seed, tanks for holding product, generally seed or fertilizer or both. It is generally advantageous to tow a seed cart in combination with a tilling implement, one behind the other, to place the seed and fertilizer under the surface of the soil. Air seeders generally include a metering system for dispensing product from the tanks and a pneumatic distribution system for delivering the product from tank to soil.

The pneumatic distribution system of an air seeder generally utilizes a centrifugal fan to provide at least one airstream, which flows through the pneumatic distribution system to seed boots where product is deposited in the soil. Product is first introduced to the air stream by the metering system at a primary distribution manifold located below the metering system. Product is carried by the air stream through distribution lines to a series of secondary distribution manifolds, which in turn distribute product through distribution lines to seed boots mounted behind ground openers on the tilling implement so that the product may be evenly delivered to the span of ground (the "tillage") acted upon by the tilling implement.

In a double shoot configuration, equipment is provided for delivering two products separately through two different air streams (or sets of air streams) to the openers. Under many circumstances, it is desirable to have a mass flow rate and/or pressure in one set of air streams different from the rate of airflow in the other set of air streams. This is commonly achieved by inserting a device into the transition area between the blower and meter on the air cart which acts as a restricting element to divert a certain amount of airflow away from one set of air streams (and generally toward the other). Conventionally, the restricting element has taken one of a variety of forms, including, for example, a plate that is hinged at one end near the boundary between the two sets of air streams, a "guillotine" type door that can be lowered to restrict flow, a stationary plate inserted over the opening of the air stream, or a butterfly valve.

A problem common to the previously mentioned methods of restricting airflow is that the change in system response versus the change in position of the restricting element is decidedly non-linear throughout the range of movement of the restricting element. Therefore, an operator attempting to change mass flow rate or pressure in a set of primary tubes has difficulty determining the degree of movement of a restricting element required to effect the desired change.

It is therefore desirable to devise a pneumatic distribution system for an air seeder that enables an operator to correlate easily and reliably an adjustment made to the position of a restricting element to a resulting system response.

SUMMARY OF THE INVENTION

The present invention provides a plenum assembly for an air seeder in a double shoot configuration, in the transition area between the fan and meter. The main function of this plenum is to direct the airflow from the fan smoothly and evenly to a series of primary tubes. In the double shoot configuration, a damper and baffle plate are also included in the plenum assembly. The damper mates up to and slides with respect to the baffle plate. The baffle plate includes upper and lower rows of openings, which preferably correspond in position to the primary tubes, and also includes a non-opened region between the rows of openings. These added features make it possible to predictably vary the mass flow rate and/or pressure in the upper and lower sets of tubes by simply raising and lowering the damper.

If the output of the fan remains constant, movement of the damper and resultant change in mass flow rate and pressure for one row of primary tubes will also effect a change in the other row of primary tubes. However, by also varying output of the fan, an operator is easily able to achieve a desired mass flow rate or pressure in each set of primary tubes.

While the damper and baffle plate arrangement of the present invention represents a substantial advance over the prior art regardless of the shape of the openings formed in the baffle plate, a more predictable response may be achieved by openings which are tapered from their ends closest to the non-opened region between the rows of openings of the plate to their ends closest to the top or bottom of the plate so that they present less and less open area for the damper to cover as the damper moves over the opening starting from the nonopened region between the rows of openings.

Preferably, the openings in the baffle plate are generally triangular. The triangular openings in the baffle plate make the system response to changes in damper position more linear during most of the range of damper travel. If the baffle plate were omitted, initial movement of the damper to close off a set of openings would not result in a noticeable response. In fact, response would be greatest during the last fourth of damper travel. With the addition of the baffle plate, however, a noticeable response is achieved immediately and this response is predictable with respect to damper position for the majority of damper movement.

It is also preferable in many situations to have each opening corresponding in position to only one of the output ports. However, in an application where restriction to airflow is undesirable or where the shape of the plenum housing is different than that of the appended drawings, for example, it may be advantageous to use shapes for at least some of the openings which would be associated with more than one of the output ports.

The damper is preferably wedge-shaped (tapered from its downstream end to its upstream end) so that it minimizes restriction to airflow. In a preferred embodiment of the invention, the damper is adjusted up and down by turning a crank.

In the following description the invention is explained in greater detail on the basis of a preferred embodiment with reference to the drawings.

BRIEF DESCRIPTION OF THE DRAWINGS

FIG. 2 is an exploded isometric view of a plenum housing and its contents according a preferred embodiment of the present invention.

FIG. 3 is a sectional view of the plenum shown in FIG. 2 taken along line 3—3 of FIG. 4 wherein the plenum housing and its contents are assembled and the damper is shown in whole.

FIG. 4 is a sectional view taken along line 4—4 as shown in FIG. 3.

DETAILED DESCRIPTION OF THE PREFERRED EMBODIMENT

Figure 1:
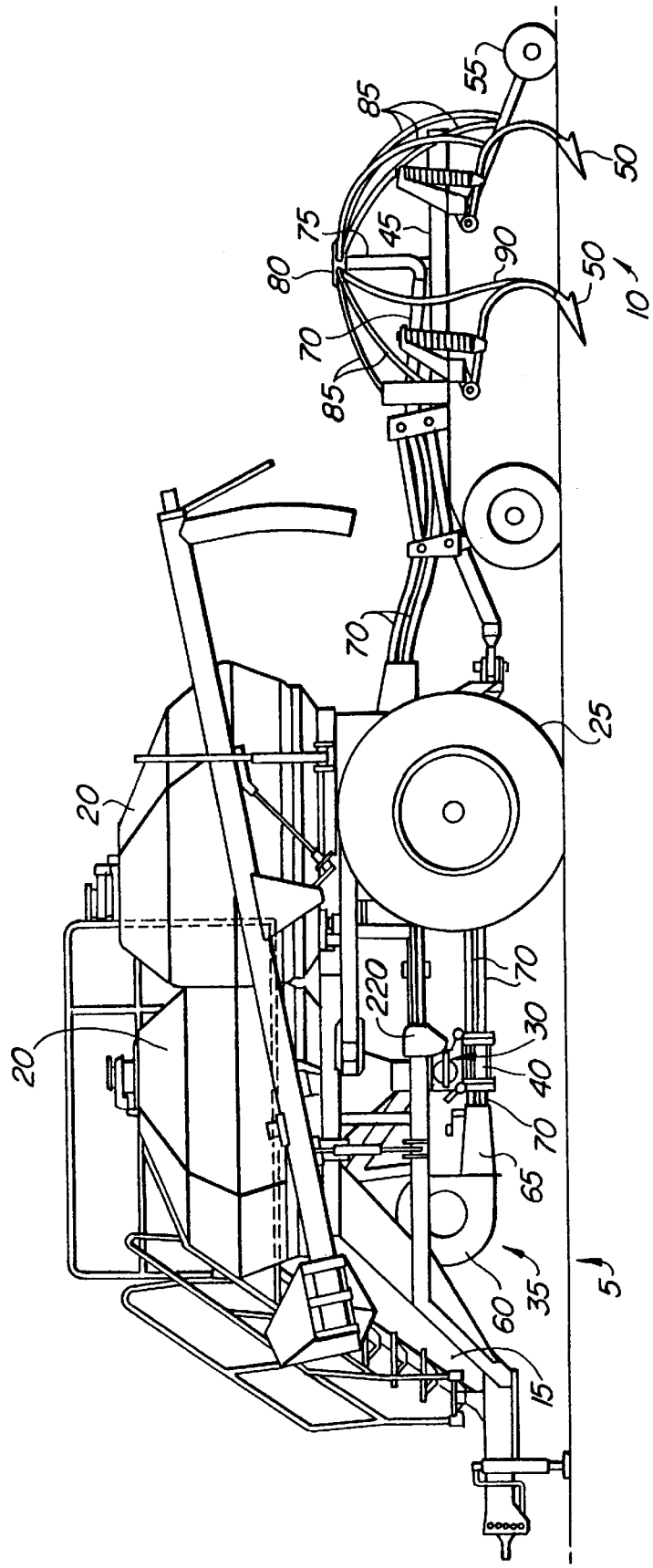
FIG. 1 is a left side elevational view of an air seeder constructed according to a preferred embodiment of the present invention.

With reference to FIG. 1, an air seeder is shown comprising a seed cart 5 generally towed between a tractor (not shown) and a tilling implement 10. The seed cart 5 has a frame 15 to which product tanks 20 and wheels 25 are mounted. Each product tank 20 has an associated metering system 30 at its lower end for controlled feeding of product into a pneumatic distribution system 35 at a primary distribution manifold 40. The tilling implement 10, towed behind the seed cart 5, consists generally of a frame 45 to which ground openers 50 are mounted. Incorporation of seed row finishing equipment such as packers 55 is also desirable in many applications.

The pneumatic distribution system 35 includes a centrifugal fan 60 which is connected to a plenum 65, which is in turn connected by primary tubes 70 to one or more primary distribution manifolds 40, each associated with a product tank 20. The primary distribution manifolds 40 are connected by the primary tubes 70 to one of a number of dimpled riser tubes 75, each of which is coupled to one of a plurality of secondary distribution manifolds 80. Secondary distribution lines 85 connect the secondary distribution manifolds 80 to seed boots 90 mounted on the ground openers 50. In addition, each product tank 20 is pressurized by air from the centrifugal fan 60, as shown, for example, in U.S. application Ser. No. 08/912,470 by David W. Gregor, filed Aug. 18, 1997, now pending, the disclosure of which is hereby incorporated by reference.

The pneumatic distribution system 35 is shown as having generally two rows of primary tubes 7B and associated ports in the primary distribution manifolds 40, representing two sets of air streams such that the product from separate product tanks 20 are not commingled as they are carried pneumatically from the product tanks 20 to the tillage. This arrangement is commonly referred to as a "double shoot" configuration.

Although the invention is discussed in terms of a preferred embodiment configured as a "tow-between" air seeder, the invention also contemplates a "tow-behind" arrangement in which the seed cart 5 is towed behind the tilling implement 10. The air seeder in a "tow-behind" arrangement would typically include additional casters (not shown) at the front end of the seed cart 5 to support load which is transmitted to the tractor through the tongue of the seed cart in the "tow-between" configuration. The operation of the air seeder in the "tow-behind" arrangement is substantially similar to that of the "tow-between" configuration; however, components are reversed such that the pneumatic distribution system 35 moves air and product from the rear of the seed cart 5 forward so that product is delivered to seed boots 90 on the tilling implement 10 in front of the seed cart 5.

Referring now to FIG. 2, to create two generally separate sets of air streams in the double shoot configuration, air from the centrifugal fan 60 (FIG. 1) flows into an inlet 63 of a plenum housing 67 in the direction indicated by arrow 68, where a plenum damper 95 directs a desired proportion of the air to upper and lower rows of plenum output ports 100 located on a downstream wall of the plenum housing 67 and associated primary tubes 70, such that each primary tube 70 in a row has substantially the same amount of air flowing through it. The plenum damper 95 is fixed in the plenum 65 by a threaded damper shaft 105 threaded through an internally threaded hexagonal sleeve 110 fixed in the plenum damper 95 by snap rings 115. A damper shaft crank 120 is connected to the damper shaft 105 by a pin 111 driven through a bore 112 in the crank 120 and an aligned cross bore 113 in the damper shaft 105 so that as the damper shaft crank 120 is turned, the damper shaft 105 rotates and the plenum damper 95 may be raised or lowered to provide the desired amount of air to each row of primary tubes 70. A plenum damper guide rod 125 and sleeve 130 extend through the plenum damper 95 to top and bottom sides of the plenum housing 67 to prevent the plenum housing 67 from expanding due to air pressure within the plenum 65.

Referring now to FIGS. 2–4, A plenum faceplate 97 is fastened along with a seal 96 to the plenum housing 67 on the downstream side of the plenum damper 95 by a series of bolts 98. The faceplate 97 comprises an outlet plate 102, which forms the downstream wall of the plenum housing 67, and which includes a number of plenum outlet ports 100. The faceplate 97 additionally comprises a stationary flow divider 150 and a perforated baffle plate 135. The baffle plate 135 is situated in the plenum housing 67 on the downstream side of the prenum damper 95 and mated against the downstream edge 140 of the plenum damper 95. The baffle plate 135 has a plurality of openings 137.

Figure 5:
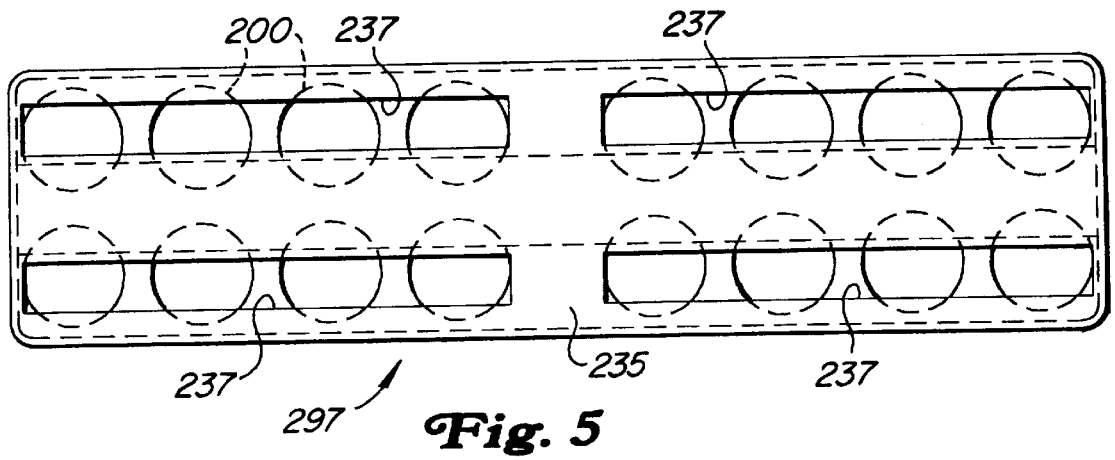
FIG. 5 is a rear view of a plenum faceplate according to the present invention wherein the baffle plate has rectangular openings, each associated with four output ports.

Preferably, the openings 137 are shaped generally as isosceles triangles as shown in FIG. 3, and each of the openings 137 is generally in axial alignment with an associated one of the plenum outlet ports 100 so that the openings 137 are arranged in two rows as are the plenum outlet ports 100. However, air flow requirements or other considerations may dictate that the shape of the openings 137 be changed or that the openings 137 each be associated with more than one of the plenum output ports 100. These alternative shapes of the openings 137 and numbers of the associated plenum outlet ports 100 are also contemplated by the present invention. For instance, where the plenum output ports 100 are close together on the outlet plate 102, a baffle plate 135 with openings 137 of triangular shape for each of the plenum outlet ports 100 may present too great a restriction to air flow. In such a case, for example, the openings 137 could be formed as two rows of elongated rectangles wherein each rectangle is associated with four of the plenum outlet ports 100. FIG. 5 shows a plenum faceplate 297 including a baffle plate 235 with elongated rectangular openings 237, each associated with four output ports 200.

Figure 6:
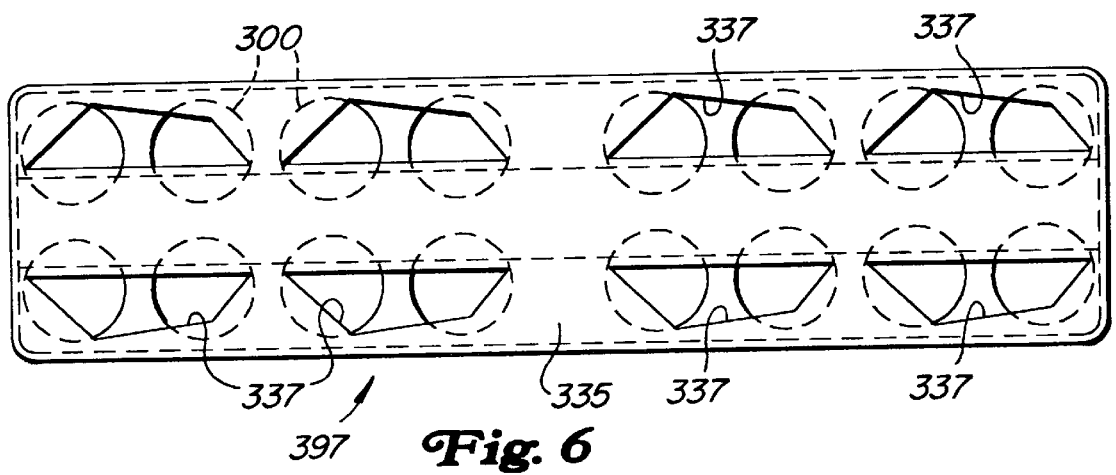
FIG. 6 is a rear view of a plenum faceplate according to the present invention wherein the baffle plate has trapezial openings, each associated with two output ports.

Another alternative is shown by FIG. 6, which illustrates plenum faceplate 397 including a baffle plate 335 whose openings 337 are trapezial, each associated with two output ports 300.

Figure 7:
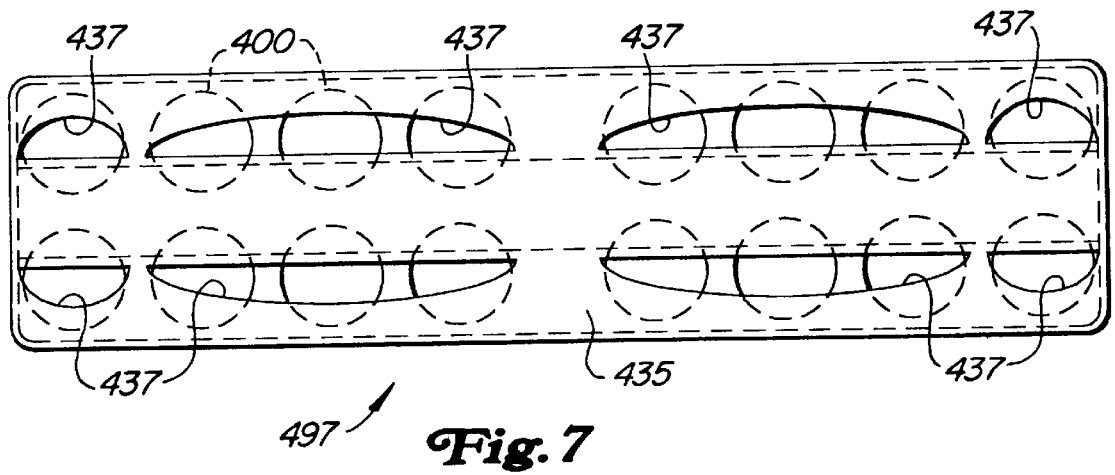
FIG. 7 is a rear view of a plenum face plate according to the present invention wherein the baffle plate has semi-elliptic openings, some of which are associated with one output port and some of which are associated with three output ports.

A further alternative is given by the plenum faceplate 497 shown in FIG. 7, which includes a baffle plate 435 which has semi-elliptic openings 437. The distal openings 437 are each associated with one output port 400, while the proximal openings 437 are each associated with three of the output ports 400.

These and still further alternative shapes of the openings 137, 237, 337 and 437 and numbers of the associated plenum outlet ports 100, 200, 300 and 400 (shown in FIGS. 4, 5, 6 and 7, respectively) are contemplated by the present invention.

Referring now to FIG. 4, although the plenum damper 95 and baffle plate 135 arrangement of the present invention provides a favorable system response regardless of the shape of the openings 100 formed in the baffle plate 135, a more predictable response versus change in movement of the plenum damper 95 may generally be achieved by providing openings 100 which are tapered from their ends closest to a region of the baffle plate 135 between the rows of openings 100 in the baffle plate 135 to their ends farthest from the region between the rows of openings 100 so that the change in area of the openings 100 covered by the plenum damper 95 decreases as the plenum damper 95 travels across the openings 100 from the region between the rows of openings 100. The openings 100 of the upper row are shown as mirror images of the openings of the lower row about a longitudinal axis of the baffle plate 135. In this arrangement, movement of the plenum damper 95 from the region of the baffle plate 135 between the rows of openings 100 will produce an analogous result whether the plenum damper 95 is moved over the upper or lower rows of openings 100.

In the embodiment of FIGS. 2–4, the stationary flow divider 150 is fixed between the baffle plate 135 and the outlet plate 102 and helps to isolate the upper and lower rows of outlet ports 100 so that air passing through the openings 137 of one row in the baffle plate 135 is substantially prevented from communicating with the outlet ports 100 corresponding to the openings 137 of the other row. A shroud 145 surrounds the area between the baffle plate 135 and the outlet plate 102 to further isolate the upper and lower rows of outlet ports 100 from air directed by the damper 95 toward the other of the rows.

Each column of plenum output ports 100 and associated primary tubes 70 represents a "run", and corresponds to placement of product at a particular portion of the width of the tillage. One of the primary tubes 70 is connected to each plenum output port 100 in use by a hose clamp 155. Plenum outlet ports 100 for runs not in use may be closed off by caps 160. The air seeder shown in the appended Figures is in an eight run, double shoot configuration. Preferably, the baffle plate 135 has an opening 137 associated with and corresponding in position to each plenum output port 100, so that the baffle plate 135 has sixteen openings 137. FIG. 4 shows such an arrangement of a baffle plate 135 having sixteen openings 137, each of an isosceles triangle shape.

During operation, the centrifugal fan 60 is driven by the tractor's hydraulic system (not shown), forcing pressurized air through the pneumatic distribution system 35. Air travels from the centrifugal fan 60 to the plenum 65, where air is diverted by the plenum damper 95 through the plurality of plenum output ports 100 to which the primary tubes 70 are coupled. The primary tubes 70 carry the air to primary distribution manifolds 40.

Product is added to one set of the primary tubes 70 at one of the primary distribution manifolds 40, and to the other set of primary tubes 70 at the other of the primary distribution manifolds 40. Air and product then flow in the pneumatic distribution system 35 from the primary distribution manifold 40 through the primary tubes 70 to the dimpled riser tubes 75 which attempt to randomize distribution of product from the secondary distribution manifolds 80 which are immediately downstream. The secondary distribution manifolds 80 divide the product substantially evenly into a series of secondary distribution lines 85 leading to the seed boots 90 on the ground openers 50 where product is delivered to the tillage.

If an operator desires to change the mass flow rate and/or pressure in one or both of the rows of primary tubes 70, the operator can turn the damper shaft crank 120 to raise or lower the plenum damper 95. An indicator 165 is mounted to the damper 95 and extends through the plenum housing 67 to show the position of the plenum damper 95 within the plenum housing 67. As the plenum damper 95 is raised or lowered, the effective area of the openings 137 is changed, as is the proportion of air directed to the top and bottom rows of outlet ports 100 by the damper 95. The operator may then adjust output of the centrifugal fan 60 by varying the hydraulic fluid flow to the fan motor to reach a desired mass flow rate or pressure in each row of primary tubes 70. Other methods for adjusting the position of the damper 95 are also contemplated by the invention. For example, one skilled in the art would recognize that movement of the damper 95 could be motorized and controlled remotely or automatically according to preset parameters.

Further advantageous embodiments are given by the subordinate claims.

What is claimed is:

1. In an air seeder, a pneumatic distribution system for delivering product through a plurality of primary tubes arranged in first and second rows, said pneumatic distribution system comprising:

a plenum housing having an upstream end and a downstream end, the upstream end of the plenum housing having an inlet and the downstream end of the plenum housing having a plurality of outlet ports arranged in first and second rows, each of said plurality of outlet ports associated with one of the primary tubes;

a fan in fluid communication with the inlet at the upstream end of the plenum housing for generating a flow of air;

a baffle plate having a plurality of openings extending therethrough mounted in the housing for governing the flow of air to the outlet ports; and a damper mounted in the plenum housing upstream from the baffle plate for directing the flow of air toward at least one of the first and second rows of outlet ports.

2. The pneumatic distribution system of claim 1 wherein the damper comprises upstream and downstream ends and said damper is tapered from its downstream end to its upstream end.

3. The pneumatic distribution system of claim 2 wherein the damper is positioned adjacent the baffle plate and is supported within the housing for movement generally parallel to the baffle plate so that the damper can be moved to a position in which it prevents communication between the fan and at least a portion of at least one of the openings in the baffle plate.

4. The pneumatic distribution system of claim 3 additionally comprising an actuator extending from the plenum housing and coupled to the damper moving the damper across the openings in the baffle plate.

5. The pneumatic distribution system of claim 1 wherein the openings in the baffle plate are arranged in first and second rows corresponding to the first and second rows of outlet ports, the first and second rows of openings are spaced apart to provide a non-opened region of the baffle plate between the rows of openings .

6. The pneumatic distribution system of claim 5 wherein the damper is positioned adjacent the baffle plate and is supported within the housing for movement generally parallel to the baffle plate from a centered positioned in which it is located within the non-opened region of the baffle plate to either side thereof to at least partially block the openings in either the first or second row of the baffle plate openings.

7. The pneumatic distribution system of claim 6 wherein each of the plurality of openings in the baffle plate corresponds in position to one of the plurality of outlet ports.

8. The pneumatic distribution system of claim 6 wherein the openings in the first row of baffle plate openings are mirror images of the openings in the second row of baffle plate openings about an axis extending across the non-opened region of the baffle plate.

9. The pneumatic distribution system of claim 6 wherein each of the openings in the baffle plate is elongated and associated with a plurality of the outlet ports.

10. The pneumatic distribution system of claim 9 wherein the openings in the baffle plate are configured as rectangles.

11. The pneumatic distribution system of claim 6 wherein said openings are tapered from their ends closest to the non-opened region to their ends farthest from the non-opened region.

12. The pneumatic distribution system of claim 11 wherein said plurality of openings in the baffle plate includes a series of generally triangular openings.

13. The pneumatic distribution system of claim 12 wherein said series of generally triangular openings are configured generally as isosceles triangles.

14. The pneumatic distribution system of claim 11 wherein said plurality of openings in the baffle plate includes a series of generally trapezial openings.

15. The pneumatic distribution system of claim 11 wherein said plurality of openings in the baffle plate includes a series of generally semi-elliptic openings.

16. The pneumatic distribution system of claim 1 wherein said baffle plate is spaced from the downstream end of the plenum housing and a stationary flow divider extends from the baffle plate to the downstream end of the plenum housing between first and second rows of baffle plate openings and the outlet ports.

17. The pneumatic distribution system of claim 16 wherein the stationary flow divider is configured as first and second plates, said first and second plates converging at the downstream end of the plenum housing.

18. The pneumatic distribution system of claim 16 additionally comprising a shroud mounted to the downstream end of the plenum housing and extending into the plenum housing for surrounding a volume defined between the downstream end of plenum housing and the baffle plate.

19. In an air seeder, a pneumatic distribution system for delivering product through a plurality of primary tubes arranged in first and second rows, said pneumatic distribution system comprising:

a plenum housing having an upstream end and a downstream end, the upstream end of the plenum housing having an inlet and the downstream end of the plenum housing having a plurality of outlet ports arranged in first and second rows, each of said plurality of outlet ports associated with one of the primary tubes;

a fan in fluid communication with the inlet at the upstream end of the plenum housing for generating a flow of air;

a baffle plate having a plurality of openings extending therethrough mounted in the housing for governing the flow of air to the outlet ports; and a damper mounted in the plenum housing upstream from the baffle plate for directing the flow of air toward at least one of the first and second rows of outlet ports; and a flow divider extending from the baffle plate to the downstream end of the plenum housing for substantially isolating air directed by the damper to the first row of outlet ports from air directed by the damper to the second row of outlet ports.

20. The pneumatic distribution system of claim 19 wherein the damper is positioned adjacent the baffle plate and is supported within the housing for movement generally parallel to the baffle plate so that the damper can be moved to a position in which it prevents communication between the fan and at least a portion of at least one of the openings in the baffle plate.

21. The pneumatic distribution system of claim 20 additionally comprising an actuator extending from the plenum housing and coupled to the damper for moving the damper across the openings in the baffle plate.

22. The pneumatic distribution system of claim 19 wherein the openings in the baffle plate are arranged in first and second rows corresponding to the first and second rows of outlet ports, the first and second rows of openings are spaced apart to provide a non-opened region of the baffle plate between the rows of openings, and said openings are tapered from their ends closest to the non-opened region to their ends farthest from the non opened region.

23. The pneumatic distribution system of claim 22 wherein the openings in the first row of openings are mirror images of the openings in the second row of openings about an axis extending across the non-opened region of the baffle plate.

24. The pneumatic distribution system of claim 23 wherein said plurality of openings in the baffle plate includes a series of generally triangular openings.

25. The pneumatic distribution system of claim 24 wherein each of the plurality of openings in the baffle plate corresponds in position to one of the plurality of outlet ports.

26. The pneumatic distribution system of claim 23 wherein said plurality of openings in the baffle plate includes a series of generally trapezial openings.

27. The pneumatic distribution system of claim 23 wherein said plurality of openings in the baffle plate includes a series of generally semi-elliptic openings.

* * * * *